United States Patent [19]

Haynes et al.

[11] 4,169,416

[45] Oct. 2, 1979

[54] EGG CARTON DISPLAY RACK AND BASKET

[75] Inventors: Joseph R. Haynes, Norcross; William F. Wainwright, Roswell; Frank D. Morris, Marietta, all of Ga.

[73] Assignee: Fisher-Haynes Corp. of Georgia, Norcross, Ga.

[21] Appl. No.: 851,946

[22] Filed: Nov. 16, 1977

[51] Int. Cl.$^2$ .............................................. A47F 5/00
[52] U.S. Cl. ..................................... 108/26; 108/111; 108/112; 211/49 D; 211/149
[58] Field of Search ......................... 108/26, 111, 112; 211/49 D, 132, 149, 150, 153, 181, 85, 195

[56] References Cited

U.S. PATENT DOCUMENTS

| | | | |
|---|---|---|---|
| 1,198,431 | 9/1916 | Forsyth | 108/111 |
| 1,769,190 | 7/1930 | Rush | 211/132 X |
| 2,680,522 | 6/1954 | Temple | 211/181 X |
| 3,124,254 | 3/1964 | Davidson | 211/132 |
| 3,351,209 | 11/1967 | Kofoed et al. | 211/49 D |
| 3,404,783 | 10/1968 | Whitman et al. | 211/132 X |
| 3,908,562 | 9/1975 | Wittschen | 108/111 |

FOREIGN PATENT DOCUMENTS 183737 4/1955 Austria ...................................... 211/149

Primary Examiner—Roy D. Frazier
Assistant Examiner—Peter A. Aschenbrenner
Attorney, Agent, or Firm—Walter M. Rodgers; Walter A. Rodgers

[57] ABSTRACT

An egg carton display includes a plurality of collapsible baskets each having a base and a pair of side walls pivotally mounted to the sides of the base to form a structure for receiving a plurality of egg cartons arranged in several tiers each tier including a plurality of cartons and a collapsible wheeled rack having a plurality of collapsible shelves each shelf being sufficiently deep in set up condition from front to back to accommodate a front row and a back row of baskets and the rack also having a non-collapsible back and collapsible side panels, the shelves of the rack being of sufficient area when collapsed to support at least as great a number of baskets when collapsed as are disposed on the shelves when the shelves and baskets are in fully set-up condition.

12 Claims, 12 Drawing Figures

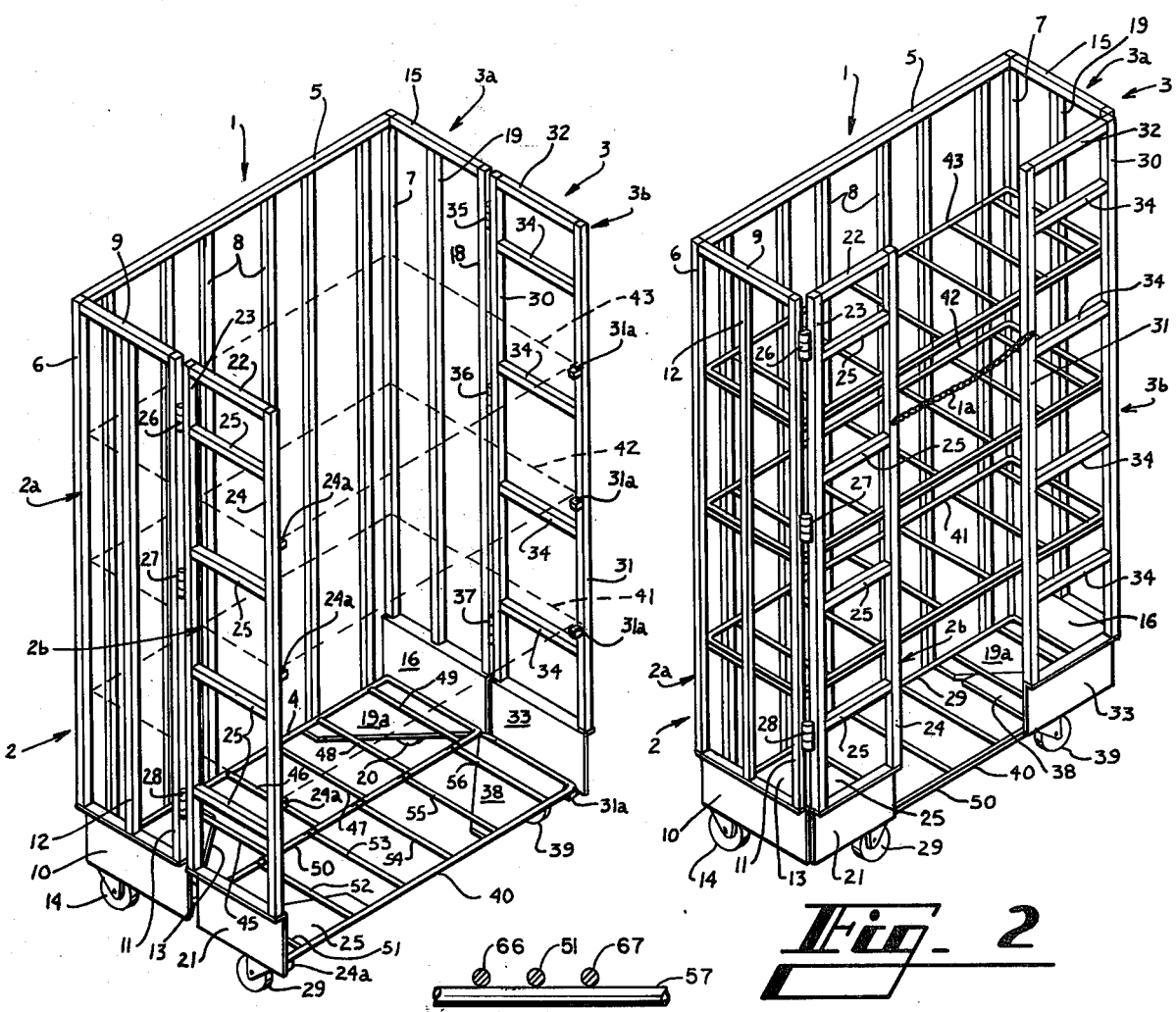
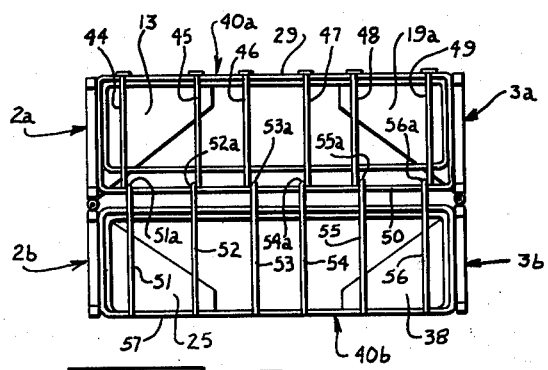
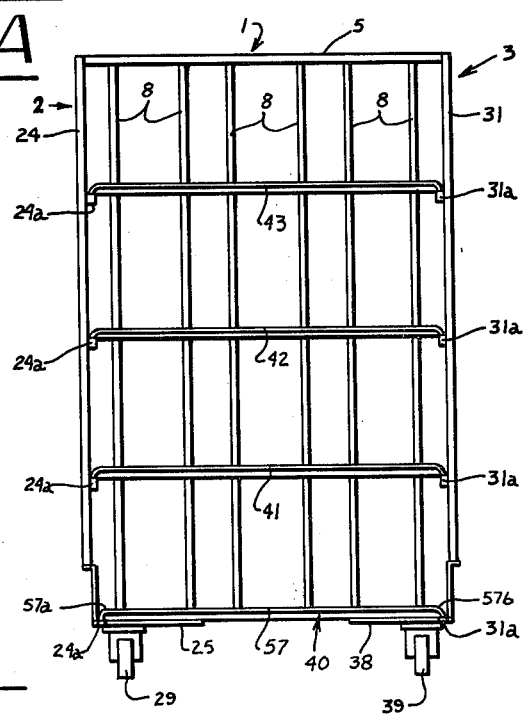

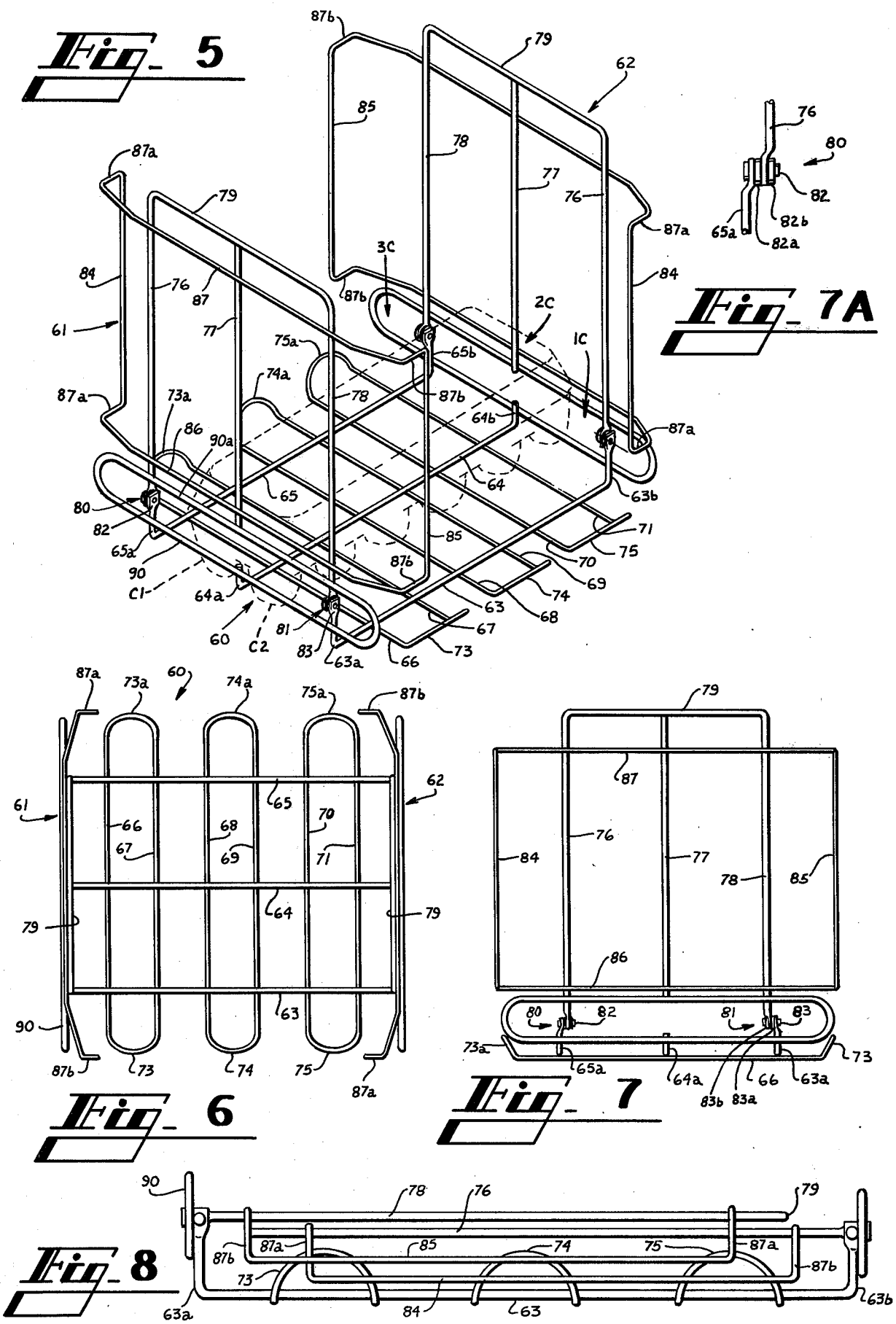

EGG CARTON DISPLAY RACK AND BASKET

One currently used system for distributing eggs from the producer to a point of purchase such as a supermarket utilizes conventional egg cartons which are packed with eggs by the egg producer and then loaded into a shipping case such as a corregated paperboard container for delivery by suitable means to the supermarket where the cases are opened and the cartons are manually deposited onto the shelves of a suitable refrigerated display.

According to another known procedure for distributing eggs to the ultimate consumer, eggs are packaged by the producer in conventional egg cartons and then deposited in an open top wire basket which in turn is transported to the supermarket and then manually deposited into a suitable display case. In such a procedure, it is necessary to return the baskets to the producer in empty condition where the producer initiates a repetition of the procedure.

Obviously either of the above described procedures requires a substantial amount of expense and time consuming manual handling of the egg cartons.

According to this invention, an egg producer loads eggs into a conventional carton and then mounts the cartons into a set up but collapsible basket which in turn is mounted on a set up but collapsible wheeled rack. Following completion of this step, the wheeled rack and associated baskets and cartons are loaded into a vehicle and are transported to the point of sale where the wheeled rack is simply rolled into a refrigerated enclosure from which the ultimate user may remove one or more cartons. After all of the baskets in a rack are completely unloaded, it is simply necessary then to collapse each basket and to collapse the rack and to store the collapsed baskets into the collapsed rack which in turn may be temporarily stored in the supermarket until their return to the producer for a repetition of the procedure. By the invention substantial economy in the use of space is accomplished and manual handling of the cartons is minimized or eliminated entirely.

A basket formed according to one form of the invention includes a base having a plurality of transverse base rods and a side wall pivotally mounted on each side of the base, each side wall having a plurality of substantially parallel abutment rods disposed in the same vertical planes as corresponding transverse base rods so that a conventional carton comprising a plurality of egg receiving cells arranged in two rows may be inserted in transverse relation into the basket from the open front and with its longitudinal center line disposed in the same vertical plane as the transverse base rods and their associated abutment rods. The side walls are frictionally mounted to the base and are engageable with bumper means affixed to each side of the base so as to limit the outward swinging movement of the side walls. Auxiliary base rods are longitudinally disposed in parallel transversely spaced relation with upturned ends for engaging the outer sides of the cartons disposed in the lowermost tier of cartons so as to prevent dislodgment thereof through the open front and back sides of the basket and inwardly offset vertically disposed retaining bars form parts of the front and back portions of each side wall so as to prevent cartons in the upper tiers from becoming dislodged through the open front or back of the basket.

A rack formed according to one form of the invention includes a non-collapsible back, collapsible sides, and collapsible shelves all mounted on wheels for ready portability, the front portion of each shelf being hingedly connected along its rear edge to the forward edge of the back portion of each shelf so that the front portion may swing into face contacting parallel relation with the back portion and each side wall having a front portion which is pivotally connected along its rear edge with the front edge of the rear portion so that after the shelves are collapsed, the front portions of the side walls may be folded inwardly and secured together. The rack is arranged so that when collapsed it is sufficiently large to accommodate at least as many collapsed baskets as are disposed on the shelves when the shelves and baskets are in fully set up condition.

For a better understanding of the invention reference may be had to the following detailed description taken in conjunction with the accompanying drawings in which:

FIG. 1 is a perspective view of a fully set up rack showing the back and side walls together with the bottom shelf and indicating the upper shelves in dotted lines for clarity;

FIG. 2 is a view similar to FIG. 1 but which shows the shelves and the side walls in collapsed condition;

FIG. 3 is a top view of the structure shown in FIG. 1 and which includes a view of the topmost shelf in fully set up condition;

FIG. 3A is a fragmentary view of parts of a rack shelf and of the bottom of a basket mounted thereon;

FIG. 4 is a front view of the rack in set up condition;

FIG. 5 is a perspective view of a basket formed according to the invention and shown in fully set up condition;

FIG. 7A is an enlarged detail view of a portion of FIG. 7;

FIG. 6 is a top view of the structure shown in FIG. 5;

FIG. 7 is a side view of the structure shown in FIG. 5;

FIG. 8 is a front view of the basket shown in FIGS. 5, 6 and 7 but which depicts the basket in fully collapsed condition;

FIG. 9 is a perspective somewhat exploded view of an enclosure and its refrigerating unit together with a rack and associated baskets and in which

Figure 9:
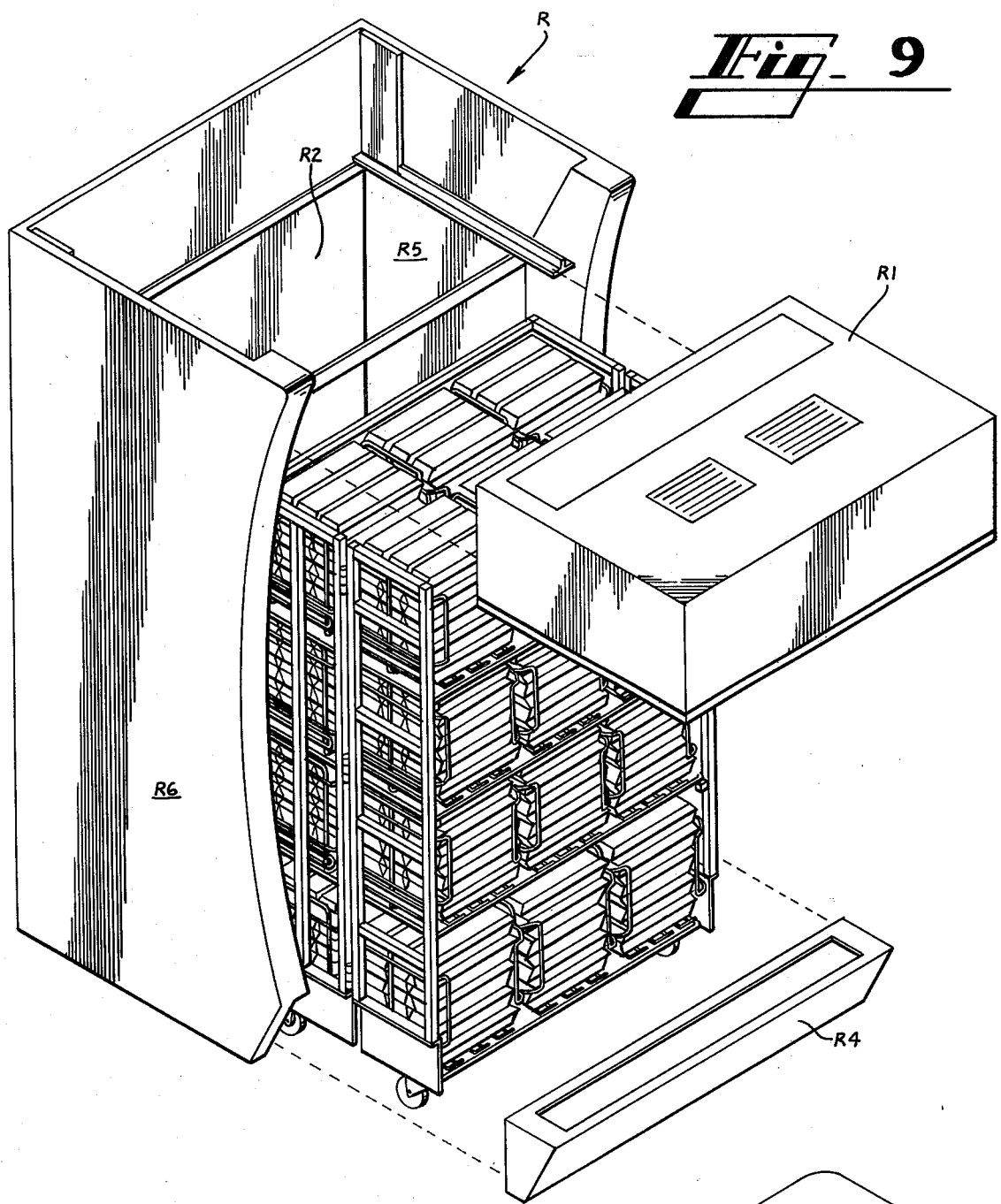

With reference to FIG. 1, the rack includes a back portion generally designated by the numeral 1 and a pair of side portions generally designated by the numerals 2 and 3. The back 1 includes a lower horizontally disposed beam 4 and an upper horizontally disposed beam 5. These beams are interconnected at their ends by vertically disposed corner posts 6 and 7 and a plurality of intermediate vertical rods 8 are disposed in spaced relation between the corner posts 6 and 7.

Side wall 2 includes a back portion generally designated at 2a and which includes an upper horizontal beam 9 and a lower horizontal beam 10 which are secured at their back ends to corner post 6 and which are secured at their front ends to vertical post 11. Intermediate vertical beams 12 are interposed between posts 6 and 11 and are secured at their upper ends to horizontal beam 9 and at their lower ends to horizontal beam 10.

Back panel 1 and the back portion 2a of side wall 2 are interconnected at their lower ends by a generally triangular shaped plate 13 which is welded or otherwise secured to beams 4 and 10 and on which swivel type wheel 14 is mounted in known manner.

Side wall 3 is similar in structure to side wall 2 and includes a rear portion generally designated at 3a and a front portion generally designated at 3b. The rear portion 3a of side wall 3 includes top horizontal beam 15 and bottom horizontal beam 16 which are interconnected with corner post 7 and with side post 18 and intermediate post 19.

A triangular base plate 19a is secured as by welding or otherwise to beams 4 and 16 and serves for mounting a swivel type roller 20.

Front portion 2b of side wall 2 includes lower horizontal beam 21 and upper horizontal beam 22 which are secured at their ends to vertical posts 23 and 24 and to which intermediate horizontal rods 25 are mounted at their ends. Generally triangular shaped base plate 25 is secured to base plate 21 and the front portion 2b of side wall 2 is hinged to the rear portion 2a of side wall 2 by hinges 26, 27 and 28.

In like fashion front portion 3b of side wall 3 includes vertical posts 30 and 31 together with upper horizontal beam 32 and lower horizontal beam 33. Intermediate horizontal beams 34 are secured at their ends to posts 30 and 31. Front portion 3b of side wall 3 is hinged to rear portion 3a by hinges 35, 36 and 37 and generally triangular base plate 38 is welded to beam 33 and serves as a mounting plate for swivel wheel 39.

As is apparent from FIGS. 1, 2 and 4, the rack includes four shelves designated by the numerals 40, 41, 42 and 43. Since all of these shelves are of identical construction only shelf 40 is described in detail. Shelf 40 includes a rear portion 40a which comprises a plurality of shelf rods 44, 45, 46, 47, 48 and 49. These rods are rigidly secured at their back ends to the vertical intermediate rods 8 respectively of the back portion and are secured along their front ends to transversely disposed rod 50.

The front portion 40b of the shelf 40 includes a plurality of longitudinally disposed shelf rods 51, 52, 53, 54, 55 and 56. These rods 51-56 are secured as by welding or otherwise to front transverse rod 57 and are provided at their rear ends with loops 51a-56a inclusive which envelope the transverse rod 50 and thus form therewith a hinge construction whereby the front portion 40b may be elevated and swung backwardly into face contacting relation atop the rear portion 40a of the shelf 40.

Following folding of all of the shelves into collapsed condition, the front portions 2b and 3b of the side walls 2 and 3 may be swung inwardly about their hinges 26-28 and 35-37 into positions of normal relationship respecting the rear portions 2a and 3a respectively as represented in FIG. 2. Chain 1a secures the front portions 2b and 3b together as is obvious.

It is apparent that saving of floor space is effected when the arrangement shown for example in FIGS. 1, 3 and 4 is collapsed into the condition represented in FIG. 2.

The structure as shown in FIGS. 1, 3 and 4 is maintained in set up condition by the downturned ends 57a and 57b of the front rods 57 which are inserted into sockets 24a and 31a formed on posts 24 and 31 respectively.

It is apparent that the structure is stable under all conditions due to the fact that the pivot wheels 29 and 39 afford movable support means during swinging movement of the front portions 2b and 3b of the side walls so that this support together with the support by the rollers 14 and 20 insures stability of the structure.

According to one aspect of the invention, the rack when fully set up as shown in FIGS. 1, 3 and 4 is constructed so that each shelf 40 receives a front row and a back row of baskets. The front and back sides of the baskets are open so that when egg cartons are depleted from a front basket, a purchaser may simply extend a hand and arm through the front basket in order to have access to cartons disposed in a rear basket.

As is apparent from FIG. 5, a basket constructed according to this invention includes a base generally designated at 60 and a pair of side walls generally designated at 61 and 62. Base 60 comprises a plurality of transversely disposed longitudinally spaced base rods 63, 64 and 65. Base rod 63 includes upturned ends 63a and 63b. In like fashion transverse base rod 64 includes upturned ends 64a and 64b while base rods 65 includes upturned ends 65a and 65b. The base 60 also includes a plurality of auxiliary base rods which are transversely spaced and longitudinally disposed and which are designated by the numerals 66, 67, 68, 69, 70 and 71. It is apparent that these rods are arranged in pairs with upturned interconnected ends. For example, rods 66 and 67 are interconnected at the front of the basket by integral curved rod 73 and at their rear ends by rod 73a. Similarly rods 68 and 69 are interconnected by upturned angularly disposed curved rods 74 and 74a while rods 70 and 71 are interconnected by upturned angularly disposed curved rod 75 at their front ends and by rods 75a at their rear ends. Rods 66-71 are welded or otherwise secured to all of the base rods 63, 64 and 65. Upturned rod ends 73, 74, 75, 73a, 74a and 75a engage the sides of transversely disposed cartons in the lowermost tier of cartons and secure these cartons against dislodgment from the basket.

Side wall 61 includes a plurality of vertically disposed longitudinally spaced abutment rods 76, 77 and 78 interconnected at their upper ends by horizontal rod 79.

Side wall 61 is pivotally mounted to a side edge of base 60 at pivots 80 and 81. As is apparent particularly from FIGS. 5, 7, and 7A, pivot 80 comprises a pivot pin 82 which is inserted through apertures formed in the lower end of abutment rod 76 and in the upper portion of upturned end 65a of base rod 65 and a pair of washers 82a and 82b. Similarly pivot 81 includes a pivot pin 83 which extends through openings formed in the lower end of abutment rod 78 and in the upper portion of upturned ends 63a of transverse base rod 63 and a pair of washers 83a and 83b. Preferably washers 82a, 82b, 83a and 83b are formed of nylon impregnated with graphite.

For engaging the outermost sides of cartons disposed in tiers above the lowermost tier to prevent inadvertent dislodgment thereof through the front or back of the basket, vertically disposed retaining bars 84 and 85 are secured to horizontal support rods 86 and 87 which in turn are secured as by welding or othewise to abutment rods 76, 77 and 78. Retaining bars 84 and 85 are offset inwardly somewhat from the vertical plane in which the abutment rods 76, 77 and 78 are disposed as indicated by the offsets 87a and 87b.

The arrangement shown in FIGS. 5, 6 and 7 is fully set up and in order to swing the side wall 61 into collapsed condition as shown for example in FIG. 8 it is simply necessary to engage a part of side wall 61 and to impart a force generally upwardly and toward the right as viewed for example in FIG. 5 to cause that structure to swing about pivots 80 and 81 into collapsed condition as shown in FIG. 8.

When the carton is manipulated from its collapsed condition shown in FIG. 8 to its set up condition shown in FIG. 5, counterclockwise swinging movement of side wall 61 is limited by the bumper structure 90 which is of an endless generally race track configuration and which is welded to the upturned ends 63a, 64a and 65a of the transverse base rods 63, 64 and 65. Thus the lower portions of abutment rods 76, 77 and 78 engage the upper reach 90a of bumper 90 and the position of side wall 61 is thus determined in approximately vertical disposition. Preferably bumper 90 is formed of sturdy semirigid springlike material so that engagement between the bumper and the parts of side wall 61 is cushioned and the arrangement is thus conducive to elimination of undesirable strains and shocks to the structure.

Side wall 62 is of a complementary configuration to side wall 61 and these walls are interchangeable in structure although it is not contemplated that disassembly of the basket would ever be effected in normal use. Thus the parts of side wall 62 are given the same numerals as are the corresponding parts of side wall 61. Similarly the bumper associated with side wall 62 is identified by the numeral 90, since it is identical in structure and function to the bumper 90 associated with the side wall 61.

Figure 10:
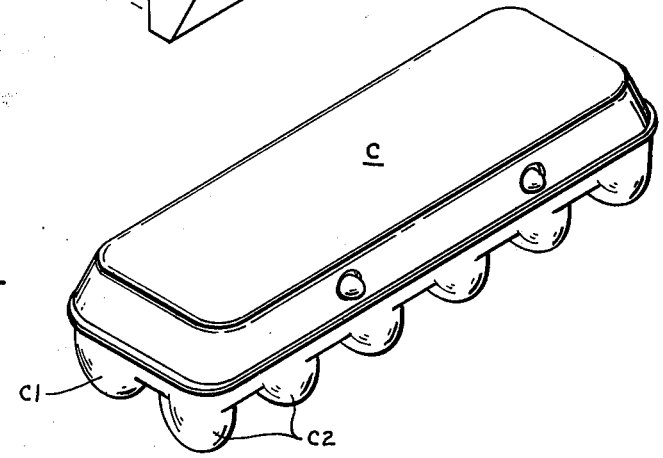
FIG. 10 is a perspective view of a conventional egg carton.

A conventional egg carton C as shown in perspective in FIG. 10 includes a plurality of cells arranged in two rows such as are designated at C1 and C2.

The basket as shown in FIG. 5 is arranged for mounting five tiers of egg cartons one atop the other, each tier including three transversely disposed egg cartons. One egg carton 1C whose position is indicated at 1C but which is not shown is mounted in the basket so that the cells C1 and C2 are disposed on opposite sides of base rod 63 and with a side of the carton in engagement with the upturned rods 73, 74, and 75. A second carton 2C is disposed as shown in dotted lines in transverse relation immediately behind the first carton 1C with its cells C1 and C2 disposed on opposite sides of transverse base rod 64 while a third carton 3C not shown but whose position is generally indicated at 3C is mounted astride transverse base rod 65. When so disposed it is apparent that the outermost side of carton 3C is disposed in engagement with upturned ends 73a, 74a, and 75a of the auxiliary base rods 66–71 inclusive so that by this means dislodgment of carton 3C through the open rear part of the basket is prevented. In addition, it is apparent that the upturned ends 63a and 63b as well as the lowermost parts of abutment rod 78 of side wall 61 and 76 of side wall 62 are disposed in the same plane as the transverse base rod 63 and the longitudinal center line of carton 1C. Thus the carton is trapped against movement outwardly toward the front by the bars 73–75 and at the rear by the carton 2C. The carton 1C may not move in an endless direction due to the upturned ends 63a and 63b. Similarly carton 2C is captured astride transverse base rod 64 with its ends in engagement with upturned ends 64a and 64b of base rod 64. In like fashion carton 3C is trapped against the rear side of carton 2C and the upturned ends 73a, 74a, and 75a of the auxiliary base rods 66–71 and the ends of carton 3C are in engagement with the upturned end 65a and 65b of transverse base rod 65.

Upper tiers of cartons are held against longitudinal movement by the vertically disposed abutment rods 76, 77 and 78 as is obvious and are secured against movement toward the front by the generally vertically disposed retaining bar 85 forming a part of side wall 61 and of bar 84 forming a part of side wall 62. The rearmost cartons in the upper tiers are secured against dislodgment by the retaining bar 84 forming a part of side wall 61 and by the retaining bar 85 forming a part of side wall 62. Of course the upper tiers of cartons are secured against sidewise movement by the abutment rods 76, 77 and 78 at opposite ends of the cartons.

With a basket such as shown in FIGS. 5, 6 and 7 fully loaded with five tiers of egg cartons and with the rack in set up condition as shown in FIGS. 1, 3 and 4, the structures as shown in the drawings are arranged so that each shelf such as 40 of the rack supports six baskets arranged in a front row of three baskets and a back row of three baskets. Furthermore the auxiliary base rods 66–71 of the baskets are spaced transversely relative to the transverse disposition of the shelf rods 51–56 and their associated shelf rods 51a–56a so that the auxiliary base rods of each basket lie alongside of and in the same horizontal plane as the shelf rods 51–56 and 51a–56a inclusive so that the auxiliary rods of the basket are out of vertical coincidence with the shelf rods of the shelf and by this means space saving is effected and stability of the structure significantly enhanced. Of course the baskets are slidable from front to rear in loading and in a reverse direction during unloading.

When fully loaded, a rack is simply manipulated on its swivel rollers 14, 20, 29 and 39 along a platform and into the load compartment of a suitable truck or other suitable means for transport to a supermarket where a reverse unloading operation is repeated. When the rack is moved into the vicinity of the refrigerated case R shown in FIG. 9 which includes a refrigerator unit R1 mounted atop the shelf R2 but shown removed from shelf R2 for clarity and with the lower front beam R4 removed, it is simply necessary then to push the rack along the floor and between the side walls R5 and R6 into position underneath the shelf R2 so that refrigerated cooled air from unit R1 effectively maintains the eggs at the desired temperature. After the rack is mounted within the enclosure R, the front beam R4 is replaced into its assembled condition immediately in front of wheels 29 and 39 and between side walls R5 and R6.

As the cartons are removed manually from the baskets in the front row of baskets on each shelf, access to the cartons disposed in the rear row on each shelf may be had by simply extending a hand and arm between the side walls 61 and 62 of an empty basket in a front row so as to engage and remove egg cartons disposed within a basket in the rear row. When the baskets are all emptied of cartons, an operator simply collapses each basket by folding the side wall 61 in a clockwise direction as viewed in FIG. 8 and by folding the side wall 62 in a counterclockwise direction as viewed in 68 so as to collapse the baskets into the condition shown in FIG. 8. Thereafter the first portion such as 40b of each shelf is swung upwardly and rearwardly into flat face contacting relation with the rear portion 40a of each shelf. The collapsed baskets are then mounted atop the collapsed shelves and the front portions 2b and 3b of side walls 2 and 3 are swung inwardly and secured together by clamping means such as chain 1a and the structure is in the condition represented by FIG. 2 and ready for return to the egg producer for a repetition of the distribution process.

The embodiments of the invention in which an exclusive property or privilege is claimed are defined as follows:

1. A collapsible basket for displaying egg cartons each having a plurality of egg receiving cells arranged in two parallel rows, said basket comprising a base having a plurality of transverse base rods and being of a width slightly greater than the length of an egg carton, and a side wall pivotally mounted on each side of said base, each side wall including a plurality of substantially parallel abutment rods, each abutment rod, the corresponding base rod, and the longitudinal center line of a carton being disposed in a common vertical plane whereby each carton is arranged to straddle a base rod with its ends in alignment with oppositely disposed abutment rods, certain of said base rods being formed with upturned ends and corresponding ones of said abutment rods being connected with said upturned ends respectively by pivot means, each of said pivot means comprising a pivot pin and high friction relatively movable contact surfaces.

2. A basket according to claim 1 wherein each of said pivot means comprises a washer formed of high friction resilient material impregnated with high friction powder.

3. A basket according to claim 2 wherein each of said pivot means comprises a washer of plastic material impregnated with graphite.

4. A collapsible basket for displaying egg cartons each having a plurality of egg receiving cells arranged in two parallel rows, said basket comprising a base having a plurality of transverse base rods and being of a width slightly greater than the length of an egg carton, and a side wall pivotally mounted on each side of said base, each side wall including a plurality of substantially parallel abutment rods, each abutment rod, the corresponding base rod, and the longitudinal center line of a carton being disposed in a common vertical plane whereby each carton is arranged to straddle a base rod with its ends in alignment with oppositely disposed abutment rods, a resilient but semirigid bumper secured to each side of said base and arranged to engage the corresponding side wall so as to limit outward swinging movement thereof, each of said bumpers comprising a generally loop shaped endless structure arranged to arrest outward swinging movement of the associated side wall when disposed substantially vertically.

5. A collapsible basket for displaying egg cartons each having a plurality of egg receiving cells arranged in two parallel rows, said basket comprising a base having a plurality of transverse base rods and being of a width slightly greater than the length of an egg carton, and a side wall pivotally mounted on each side of said base, each side wall including a plurality of substantially parallel abutment rods, each abutment rod, the corresponding base rod, and the longitudinal center line of a carton being disposed in a common vertical plane whereby each carton is arranged to straddle a base rod with its ends in alignment with oppositely disposed abutment rods, a vertically disposed retaining bar forming a part of the front and back portion of each side wall and each retaining bar being offset inwardly from its associated side wall for engaging the side edges of transversely arranged cartons disposed in the basket for securing the cartons therein against dislodgment therefrom.

6. A basket according to claim 5 wherein the front retaining bar on each side of the basket is spaced from the corresponding rear retaining bar by a distance which is slightly greater than a multiple of the width of a carton.

7. A basket according to claim 5 wherein the retaining bars associated with each side wall of the basket are secured at their ends to a pair of vertically spaced generally horizontal support rods forming parts of the associated side wall.

8. A basket according to claim 7 wherein said support rods are secured to at least some of the abutment rods forming parts of the associated side wall.

9. A collapsible basket for displaying egg cartons each having a plurality of egg receiving cells arranged in two parallel rows, said basket comprising a base having a plurality said base transverse base rods and being of a width slightly greater than the length of an egg carton, and a side wall pivotally mounted on each side of said base, each side wall including a plurality of substantially parallel abutment rods, each abutment rod, the corresponding base rod, and the longitudinal center line of a carton being disposed in a common vertical plane whereby each carton is arranged to straddle a base rod with its ends in alignment with oppositely disposed abutment rods, said base including a plurality of generally parallel transversely spaced longitudinally disposed auxiliary base rods secured to said rods to form a unitary base structure and said auxiliary base rods including upturned front and back ends for engaging the outer sides of the front and back cartons in the lowermost tier of cartons to prevent dislodgmemt of the cartons from the basket in forward and rearward directions.

10. A basket according to claim 9 wherein said auxiliary base rods are arranged in pairs and with the corresponding upturned ends of the rods of each pair interconnected or integral with each other.

11. A display comprising a plurality of collapsible baskets each having a base and a pair of side walls pivotally mounted to the sides of the base to form a structure which is open at its front and back, and a collapsible rack having a plurality of shelves each of which includes a front portion hingedly connected along its rear edge to the front edge of a rear portion, each shelf being sufficiently deep to accommodate a front row and a back row of baskets and access to each basket in a back row of baskets being through the open front and back portions of the corresponding basket in the corresponding front row of baskets, said rack comprising collapsible side walls each having a front portion hingedly connected along its rear edge with the front edge of a rear portion thereof whereby the front portions of the side walls may be swung inwardly into positions approximately normal to the rear portions of the side walls following swinging movement of the front portions of said shelves into generally parallel relation with the shelf rear portions, the shelves being of sufficient areas when collapsed to support at least as great a number of baskets when collapsed as are disposed on the shelves when said shelves and baskets are in fully set up condition.

12. A display comprising a plurality of collapsible baskets each having a base which includes a plurality of transversely disposed longitudinally spaced base rods and a plurality of pairs of generally parallel transversely spaced longitudinally disposed auxiliary base rods secured to and disposed underneath said base rods with each pair of rods having interconnected upturned ends and a pair of side walls pivotally mounted to the sides of the base to form a basket structure which is open at its front and back, and a collapsible rack having a plurality of shelves each of which includes a fixedly mounted rear portion and a front portion hingedly connected along its rear edge to the front edge of the rear portion, each shelf being sufficiently deep to accommodate a front row and a back row of baskets and access to each basket in a back row of baskets being through the open front and back portions of the corresponding basket in the corresponding front row of baskets and each shelf having a plurality of generally parallel transversely spaced longitudinally disposed shelf rods, said auxiliary base rods of each basket being transversely spaced from each other and in such manner as to occupy positions out of coincidence with said shelf rods of each rack whereby the shelf rods of each shelf are disposed in a common plane with the auxiliary base rods of the associated baskets.

* * * * *